United States Patent
Bowcott

[15] 3,665,233
[45] May 23, 1972

[54] DYNAMO ELECTRIC MACHINES

[72] Inventor: Roy Price Bowcott, Solihull, England
[73] Assignee: Joseph Lucas (Industries) Limited, Birmingham, England
[22] Filed: Oct. 28, 1970
[21] Appl. No.: 83,223

Related U.S. Application Data

[62] Division of Ser. No. 797,457, Feb. 7, 1969, abandoned.

[52] U.S. Cl..................................................310/234
[51] Int. Cl...................................................H02k 13/04
[58] Field of Search..................310/234, 233, 236, 237; 29/597, 630; 339/244

[56] References Cited

UNITED STATES PATENTS

| | | |
|---|---|---|
| 2,572,956 | 10/1951 | Servis............................29/597 |
| 2,884,749 | 7/1958 | Shetterly........................29/597 |
| 3,568,309 | 3/1971 | Preece...........................310/234 |
| 3,522,462 | 8/1970 | Schwartz........................310/234 |
| 3,145,260 | 8/1964 | Reid..............................339/244 |

Primary Examiner—J. D. Miller
Assistant Examiner—R. Skudy
Attorney—Holman & Stern

[57] ABSTRACT

A dynamo electric machine having a wound rotor and a commutator rotatable with the rotor. The conductors of the rotor are in pairs each pair being connected electrically to a respective commutator segment. One end of one conductor of each pair is electrically and physically connected to the other conductor and a projecting portion of said other conductor is electrically connected to the commutator segment.

4 Claims, 5 Drawing Figures

INVENTOR
Roy Price Bowcott

DYNAMO ELECTRIC MACHINES

This invention relates to dynamo electric machines and is divided from my copending application Ser. No. 797,457 filed Feb. 7, 1969, now abandoned.

A dynamo electric machine according to the invention includes a wound rotor and a commutator rotatable with the rotor, the conductors of the rotor being electrically connected in pairs to the segments of the commutator, one end of one conductor of each pair of conductors being electrically and physically connected to the respective segment and the one end of the other conductor of the pair of conductors being electrically and physically connected to said one conductor adjacent the segment.

Figure 5:
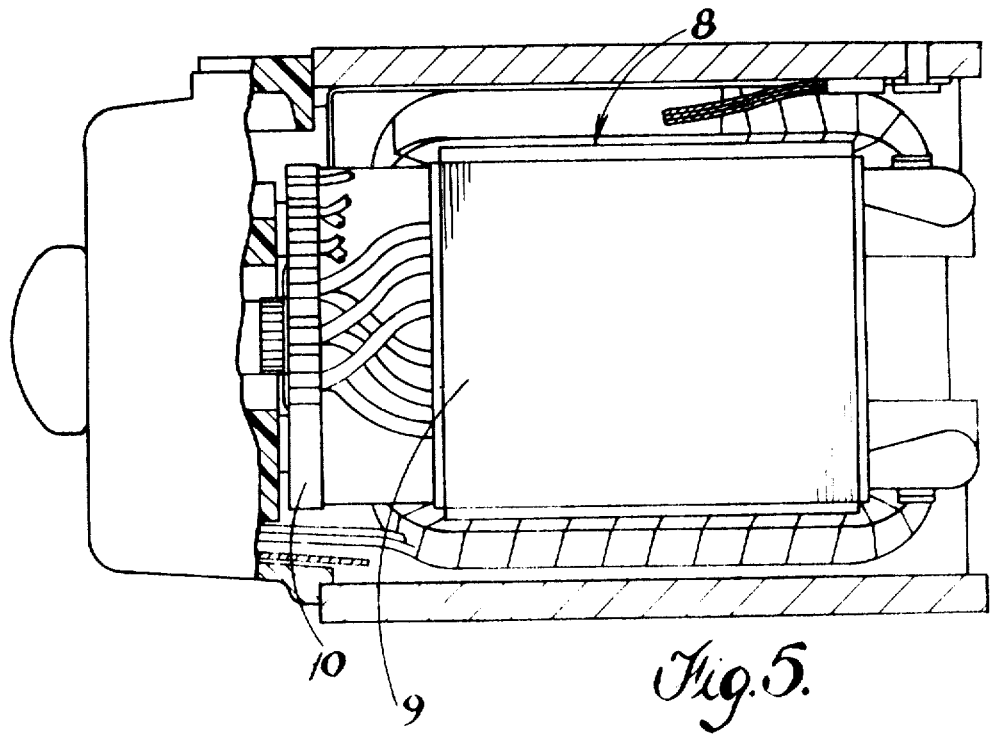

One example of the invention is illustrated in the accompanying drawings wherein:

FIGS. 1 to 4 illustrate four stages in the connection of rotor conductors of a dynamo electric machine to the commutator thereof, and FIG. 5 is a sectional view of part of the completed machine.

In the example to be described, a dynamo electric machine (FIG. 5) includes a rotor 8 having a rotor assembly carrying windings 9 and a face type commutator 10 to which the windings 9 of the rotor assembly are to be electrically connected. The windings 9 of the rotor assembly are formed from copper strip and the arrangement is such that the ends of pairs of windings are to be electrically connected to respective single segments of the commutator 10. The segments of the commutator 10 includes respective integral risers to which the windings are to be electrically connected.

The pairs of windings are connected to their respective segments in the following manner.

Figure 1:
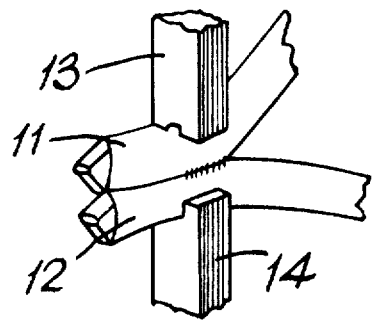
Figure 2:
Figure 3:
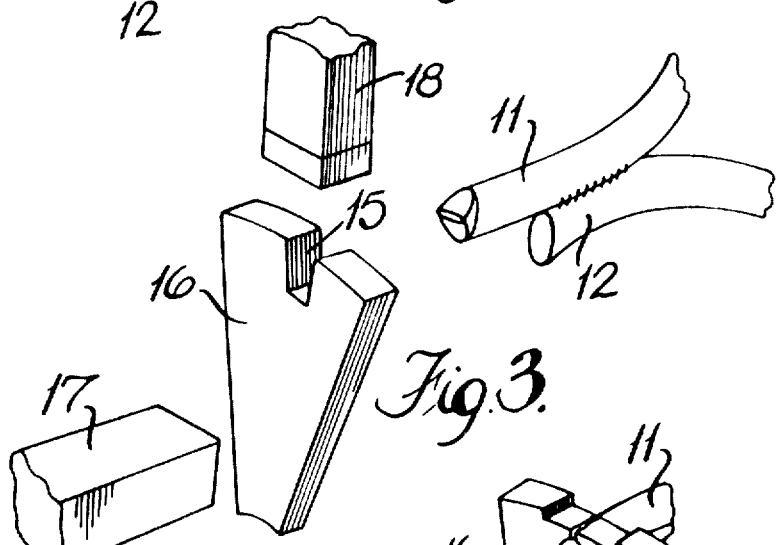
Figure 4:
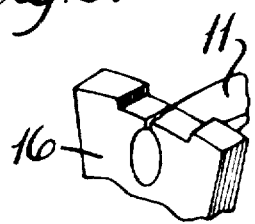

Two conductors 11,12 of the winding 9 are led from the rotor assembly towards the commutator 10 and are resistance welded to one another adjacent the commutator using a pair of electrodes 13,14 (FIG. 1). The free end of the conductor 12, at the side of the weld remote from the rotor assembly, is severed so that the conductor 11 is longer than the conductor 12 as shown in FIG. 2. The free end of the longer conductor 11 is then inserted into a slot 15 in the riser 16 of the respective commutator segment as shown in FIG. 3, and the arrangement is such that when the end of the longer conductor 11 is housed in the slot 15, the free end of the shorter conductor 12 lies adjacent the rear face of the riser 16.

The riser is then subjected to a hot staking process to deform the wall of the slot in the riser, in a manner to trap the free end of the conductor 11 in the slot, and to electrically interconnect the riser 16 and the conductor 11. The hot staking process is carried out by engaging an electrode 17 with the face of the riser, and engaging a second electrode 18 with the top of the riser adjacent the open end of the slot as shown in FIG. 3. An electric current is then passed between the electrodes 17,18 which causes the portion of the riser between the electrodes to become heated, whereupon the second electrode is used as a press tool to deform the walls of the slot in the riser. In this way, the segment is electrically connected through its riser to the longer conductor 11 and through the free end of the longer conductor 11 to the shorter conductor 12. Moreover, the deformation of the riser physically connects the end of the longer conductor 11 to the commutator, so that both conductors 11,12 are held in place relative to the commutator. The other pairs of conductors are connected to their respective segments in similar manner.

It will be appreciated that windings can be secured to either barrel or face commutators in the manner described above.

Having thus described my invention what I claim as new and desire to secure by Letters Patent is:

1. A dynamo electric machine including a wound rotor and a commutator rotatable with the rotor, the conductors of the rotor being electrically connected in pairs to the segments of the commutator, one end of one conductor of each pair of conductors being electrically and physically connected to the respective commutator segment and the one end of the other conductor of the pair of conductors terminating short of the commutator segment and being electrically and physically connected to said one conductor adjacent the segment, so as to be electrically connected to the segment through said one conductor.

2. A dynamo electric machine as claimed in claim 1 wherein the commutator is a face type commutator.

3. A dynamo electric machine as claimed in claim 1 wherein said other conductor is welded to said one conductor adjacent the end of said one conductor, the end of said one conductor projecting beyond the end of said other conductor.

4. A dynamo electric machine as claimed in claim 1 wherein said one conductor is physically and electrically connected to the respective commutator segment by engaging the end of said one conductor in a slot in said one segment and then hot staking the segment to connect the segment to the conductor.

* * * * *